United States Patent [19]

Lordi et al.

[11] Patent Number: 4,486,570

[45] Date of Patent: Dec. 4, 1984

[54] HEAT RESISTANT HIGH IMPACT POLYMER COMPOSITIONS AND METHOD OF MAKING SAME

[75] Inventors: Frank E. Lordi; Jacob Triplett, both of West Chester, Pa.

[73] Assignee: Atlantic Richfield Company, Los Angeles, Calif.

[21] Appl. No.: 523,230

[22] Filed: Aug. 15, 1983

Related U.S. Application Data

[63] Continuation of Ser. No. 342,293, Jan. 25, 1982, abandoned.

[51] Int. Cl.$^3$ ............................................ C08F 279/02
[52] U.S. Cl. ..................................................... 525/93
[58] Field of Search .......................................... 525/93

[56] References Cited

U.S. PATENT DOCUMENTS 4,097,550  6/1978  Haaf ..................................... 525/93
4,269,950  5/1981  Abolins ................................ 525/93

*Primary Examiner*—Paul R. Michl

*Attorney, Agent, or Firm*—Dennis M. Kozak

[57] ABSTRACT

A styrenic copolymer composition having increased resistance to heat, markedly improved impact resistance and excellent processability for injection molding, extrusion, thermal formability and the like is made by the polymerization of a vinyl aromatic monomer and an ethylenically unsaturated dicarboxylic acid moiety in the presence of at least two different rubbery additives. At least one, but not all of the rubbery additives consists of a copolymer of from 40 to 95% by weight of a vinyl aromatic monomer and 5 to 60% by weight of a conjugated diene monomer. This admixture permits addition of up to about 40% or more by weight of the total product of the rubbery additives. The properties achieved offer an attractive balance found only in higher priced engineering polymer materials. The polymerization process is preferably continuous and of the free radical type. It is significant that the process affords energy conservation, even though it is adapted to handling higher concentrations of rubbery additives than hitherto found possible.

3 Claims, No Drawings

HEAT RESISTANT HIGH IMPACT POLYMER COMPOSITIONS AND METHOD OF MAKING SAME

This is a continuation of application Ser. No. 342,293 filed Jan. 25, 1982, abandoned.

BACKGROUND OF THE INVENTION

It is known to make rubber-modified styrene/maleic anhydride copolymers by dissolving a rubbery additive in the monomer mixture and copolymerizing. Generally, the rubbery additives are soluble in the vinyl aromatic monomer or in the mixture of monomers. However, in the past the addition of as much as about 16 or 17% by weight of the total copolymer of rubber is all that can be tolerated in a commercial-type reactor due to the high viscosity of the monomers when admixed with a rubbery additive.

The blending of rubbery additives to a styrene/maleic anhydride copolymer or to a rubbery modified copolymer is also known. U.S. Patents such as Nos. 4,097,550, 4,097,551, 3,641,212 and 2,914,505 all relate to the improvement of thermoplastic compositions by rubbery additive admixtures but all of these patents teach the blending of the rubbery additives with the copolymer.

U.S. Pat. No. 3,919,354, issued Nov. 11, 1975, shows the making of a rubber-modified styrene/maleic anhydride copolymer having impact resistance and that is prepared by providing a solution of the rubber in styrene, initiating free radical polymerization and then adding maleic anhydride at a rate substantially less than the rate of polymerization of the styrene. However, this patent does not teach or achieve the greater product or improvement obtained by the present invention, nor the improvements in the process of making such improved product. Further, the patent states that the non-equimolar random copolymers are obtainable, preferably by the steps described in the patent as set forth above. In fact, the patent states that a polymer prepared from 75 mole percent styrene and 25 mole percent maleic anhydride by admixing the monomers with suitable diluent and catalyst, heating until polymerization is about complete, will yield a polymer or polymer mixture which is not suitable for the practice of the invention.

It has been discovered by the present invention that when two different rubbery additives are used and are present during the polymerization of the copolymer that a striking phenomenon occurs. As the copolymerization occurs, a lower viscosity of the complete mixture is evident, the process may thus be more readily carried out with a marked decrease in the energy requirements. Secondly, an improved product is made in that not only is heat resistance improved, but, in addition, impact is significantly improved and the product is upgraded to the quality of the so-called engineering materials which are considered specialty products with a correspondingly high price.

The surprising discovery of using at least two rubbery additives and having the same present during the polymerization of the copolymer permits the permissible amount of rubber additives to be greatly increased and this in turn correspondingly improves the impact properties of the resulting product. As an additional feature, it has been found that the processability of the resultant product, as well as its glossy surface appearance, is greatly improved.

SUMMARY OF THE PRESENT INVENTION

An improved copolymer composition suitable for fabrication by many methods, such as, injection molding, extrusion, thermoforming and the like and the process for making the same is an essential object of the present invention.

The composition comprises a copolymer base resin, preferably a vinyl aromatic compound and an alpha, beta-unsaturated cyclic anhydride, modified by at least two different rubbery additives, wherein at least one, but not all, of said rubbery additives consists of a copolymer of from 40 to 95% by weight of a vinyl aromatic monomer and 5 to 60% by weight of a conjugated diene monomer.

It is essential to the present invention that the rubbery additives are present at the time of polymerization of the base copolymer resin. It is believed that (1) greater dispersion of the rubbery additives is thereby achieved and (2) an interaction of the rubbery additives reduces the particle size of the resultant rubber particles precipitated during polymerization of the base resin copolymer or matrix to provide the improved results. It is known that the resultant product of the present process possesses high heat resistance, considerably increased impact strength and improved processability during fabrication. For example, in thermoforming higher draw depths at increased temperatures are permissible. The final product exhibited higher draw depths (elongation) before detecting a minimal five pound force on the test instrument and at the break point, especially at elevated temperatures and in comparison to a non-modified styrene copolymer. The end product also has a glossier finish, believed attributable to the finer size rubbery additive particles.

DETAILED DESCRIPTION OF THE INVENTION

The compositions of the present invention comprise (a) from 60 to 90% by weight of a base resin or copolymer of 70 to 98% by weight based on copolymer of a more vinyl aromatic compound and from 2 to 30% by weight based on copolymer of an ethylenically unsaturated dicarboxylic acid moiety that have been copolymerized in the presence of (b) from 7 to 40% by weight of at least two differing rubbery additives. The rubbery additives comprise 5 to 20% by weight based on total composition of at least one high diene rubbery additive and from 2 to 20% by weight based on total composition of at least one high vinyl aromatic rubbery additive. These rubbery additives are generally soluble in the vinyl aromatic compound. It is essential to achieve the results of the present invention that the rubbery additives are present during polymerization of the base resin copolymer or matrix. As will be further explained later, blends of the same ingredients even as intimately blended as melt blends do not provide the results obtainable by the practice of the present invention.

THE DICARBOXYLIC ACID MOIETY

The ethylenically unsaturated dicarboxylic acid moiety may be an acid itself, its anhydride, its imide or substituted imides or a half acid derivative of such a dicarboxylic acid or mixtures thereof. Suitable acids and their derivatives useful in the present invention are maleic acid, fumaric acid, itaconic acid, citraconic acid, mesaconic acid, ethylmaleic acid, methyl itaconic acid, chloromaleic acid, dichloromaleic acid, bromomaleic acid, dibromomaleic acid, and phenylmaleic acid, the anhydrides of these acids, the imides and N-substituted imides of these acids, or the half esters of these acids with suitable alcohol. The alcohol used may be the primary and secondary alkanols containing up to 6 carbon atoms, such as, methyl alcohol, ethyl alcohol, n-propyl alcohol, sec-butyl and n-pentyl alcohol; halogenated alcohols having up to 6 carbon atoms such as 2,3-dichloro-1-propanol, and 2-bromo-1-propanol; arylalkyl alcohol, such as benzyl alcohol; cyclic alcohols having up to 6 carbon atoms, such as, cyclopentanol, cyclohexanol, and tetrahydrofurfuryl alcohol; ether alcohols, such as 2-butoxyethanol and the ethyl ether of diethyleneglycol, and the like.

The imide derivatives may be prepared by reacting the starting anhydride or diacid copolymers with aqueous ammonia or amines. Suitable amines are the alkyl amines having 1 to 4 carbon atoms, such as, methylamine, ethylamine, propylamine, isopropylamine and butylamine; ethanolamine; aniline, benzylamine, allylamine and the like. Also suitable are the water soluble $\alpha,\omega$-alkylenediamines having 2 to 6 carbon atoms in the alkylene group, such as ethylenediamine, and hexamethylenediamine. Arylene diamines such as phenylene diamines and benzidines may also be used. The diamines are useful for preparing copolymers having varying degrees of crosslinking. These diamines may be used alone or in combination with other monoamines to give varying degrees of crosslinking.

THE VINYL AROMATIC COMPOUNDS

Suitable vinyl aromatic comonomers include styrene, alpha-methylstyrene, nuclear methylstyrenes, ethylstyrene, isopropylstyrene, tert-butylstyrene, chlorostyrenes, dichlorostyrenes, vinylnaphthalene and mixtures of these.

HIGH DIENE RUBBERY ADDITIVES

Suitable rubbery additives or elastomers include diene rubbers which contain at least 50% by weight of a conjugated 1,3-diene. These include conjugated 1,3-diene rubbers, styrene-diene-copolymer rubbers, acrylonitrile diene copolymer rubbers, ethylene-propylenediene terpolymer rubbers, acrylate-diene copolymer rubbers and mixtures thereof. Preferred rubbers are diene rubbers such as homopolymers of conjugated dienes such as butadiene, isoprene, chloroprene, and piperylene and copolymers of such dienes with up to 50 mole percent of one or more copolymerizable monoethylenically unsaturated monomers, such as styrene, substituted styrenes, acrylonitrile, methacrylonitrile and isobutylene. Also suitable are the graded block copolymer rubbers and A-B block copolymer rubbers containing 70 to 95% by weight of butadiene and 5 to 30% by weight of styrene.

The diene block copolymer rubbers suitable for the present invention are block copolymers of vinyl aromatic compounds and conjugated dienes wherein the blocks of conjugated dienes will have average molecular weights greater than the molecular weight of the combined blocks of vinyl aromatic compounds.

These block copolymers will generally be 2 to 50% by weight vinyl aromatic compound and 50 to 98% by weight conjugated diene. Preferably, the vinyl content will be 10 to 40% with the diene content of 60 to 90%. The vinyl aromatic compounds may be styrene, alpha methylstyrene, nuclear methylstyrenes, ethylstyrene, isopropylstyrene, tert-butylstyrene, chlorostyrenes, dichlorostyrenes and vinyl naphthalene and the like. The preferred compound is styrene.

The conjugated diene may be butadiene, isoprene, chloroprene and piperylene. The preferred dienes are butadiene and isoprene.

Suitable block copolymer rubbers are the graded block, A-B diblock, the radial or star block, A-B-A triblock and the A-B-A hydrogenated triblock rubbers.

All of the block copolymer rubbers can be made by known processes involving anionic initiators such as butyl lithium.

Graded diblock rubbers are those A-B type block copolymers in which each A block is essentially polymerized vinyl aromatic monomer with a minor amount of a conjugated diene, and each B block is essentially a conjugated diene polymer with a minor amount of vinyl aromatic monomer. Such graded block rubbers may be prepared by polymerizing a mixture of the vinyl aromatic monomer and the diene in a neutral solvent, such as n-hexane, using a sec-butyl lithium catalyst. In this type of system, the initial polymer chains are predominantly polydiene, but as the diene is depleted, the later polymer formed is predominantly polyvinyl aromatic monomer. Such copolymer rubbers are also available commercially, as for instance Stereon 720, a Firestone Synthetic Rubber & Latex Co. product having 90% by weight butadiene and 10% by weight styrene with 55% by weight of the styrene appearing as polystyrene blocks.

Diblock copolymer rubbers are copolymers of A-B type wherein A represents a block of poly(vinyl aromatic monomer) and B represents a block of poly(conjugated diene). True diblock copolymer rubbers are made by polymerizing one of the monomers to essential completion and then adding the second monomer. Thus, butadiene may be anionically polymerized using sec-butyl lithium catalyst. Then, prior to termination of the polymer chains, the styrene is added and polymerization allowed to continue. Diblock copolymers may also be prepared by separately polymerizing each monomer in the presence of a lithium catalyst and then combining the separate blocks by reacting the lithium terminated blocks together in the presence of a difunctional coupling agent. Such diblock rubbers are also available commercially, as for instance Solprene 1205, a Phillips Petroleum Company product having 75% by weight polybutadiene and 25% by weight polystyrene.

Radial or star block copolymer rubbers are branched copolymers having at least three A-B diblock chains connected to a central nucleus. Thus, chains of block copolymers prepared by polymerizing vinyl aromatic monomers and conjugated diene monomers in inert solvents using organo-lithium catalysts can be added, while still lithium terminated, to compounds having at least three functional sites capable of reacting with the lithium to carbon bond and adding to the carbon possessing this bond in the copolymer. Such polyfunctional compounds are, for example, polyepoxides, polyisocyanates, polyimines, polyaldehydes, polyketones, polyanhydrides, polyesters, etc. Such radial block rubbers are also available commercially, as for instance Solprene 406 and Solprene 414 products of Phillips Petroleum Co. having 60% by weight polybutadiene and 40% by weight polystyrene. Another example is Solprene S411P, containing 70% butadiene, 30% styrene and a coupling agent.

Triblock copolymer rubbers are linear copolymers of the A-B-A or B-A-B type, wherein, again, A represents a block of poly(vinyl aromatic monomer) and B represents a block of poly(conjugated diene). Such triblock copolymers can be prepared by sequential addition of the desired monomers into a lithium alkyl initiated polymerization. Another effective method would be to polymerize the diene monomer, for example, in the presence of difunctional catalyst, such as dilithiostilbene, and then adding the vinyl aryl monomer to form the end blocks. Such triblock copolymer rubbers are also available commercially as, for example, Kraton 1101, a product of Shell Chemical Co. being a polystyrene-polybutadiene-polystyrene triblock rubber having 70% by weight polybutadiene and 30% by weight polystyrene.

Also suitable are the hydrogenated triblock copolymer rubbers formed by, for example, selective hydrogenation of A-B-A triblock type copolymers. Especially suitable are the hydrogenated triblock copolymer rubbers wherein the hydrogenation has been primarily in the polydiene blocks, B. Thus, U.S. Pat. No. 3,595,942 describes the polymers and suitable methods for their hydrogenation such that at least 80% of the aliphatic unsaturation has been reduced by hydrogenation and less than 25% of the aromatic unsaturation of the vinyl aromatic monomer blocks, A, have been hydrogenated. Such copolymers are available commercially as, for example, Kraton G, a product of Shell Chemical Co., being a polystyrene-polyisoprene-polystyrene triblock rubber wherein the polyisoprene portion has been hydrogenated to a poly(ethylene/propylene) copolymer block.

Another preferred rubbery additive is a high cis content 1,4, polybutadiene with 98% cis content, sold under the trademark Taktene 1202.

HIGH VINYL AROMATIC RUBBERY ADDITIVES

Although the high monovinyl aromatic copolymers are not strictly "rubbery", they are designated as rubbery additives herein because of the effect their addition to the present system has on the impact and thermal properties.

Any of the types of block copolymers described above under High Diene Rubbery Additives can be prepared using greater amounts of vinyl aromatic monomer than conjugated diene in the described procedures. Those prepared having from 40 to 95% by weight of vinyl aromatic monomers and 5 to 60% by weight of conjugated diene monomers are suitable for use in the present invention as high vinyl aromatic additives.

Thus, Stereon 840 is a graded diblock copolymer of about 57% by weight butadiene and 43% by weight styrene and is sold by Firestone Synthetic Rubber & Latex Co.

Another suitable high vinyl aromatic rubbery additive is a radial block copolymer of 75% by weight styrene and 25% by weight butadiene, sold by Shell Chemical Co. under the tradename KR03.

Branched, radial block copolymers, which are also suitable for the present invention, can be prepared using the methods taught in U.S. Pat. No. 4,180,530.

The polymerization of the base resin copolymer may be accomplished by any of the several available methods for the preparation of the non-equimolar copolymers of vinyl aromatic compounds and dicarboxylic acid moieties. They may be prepared in accordance with the principles of the continuous recycle polymerization process such as described in U.S. Pat. Nos. 2,769,804 and 2,989,517; or by the suspension polymerization process described in U.S. Pat. No. 3,509,110. A continuous polymerization process is preferred (even though recycling is only done after purification of the materials), because it appears to lend itself to the advantages of the present invention, such as, the possibility of the increase of greater rubber content and the energy conservation potential discovered in carrying out the present invention.

For example, in continuous polymerization process there are inherent limitations in that if more than about 15 to 17% by weight of finished product of a rubbery additive is used, the viscosity of the total mix or syrup becomes so high that agitation and continued polymerization cannot be accomplished.

According to the present invention, when a total of 20% of at least two different rubbery additives are present during polymerization, it is found that when polymerization reaches a point where the syrup contains about 45% or so solids, the viscosity, which at the start of polymerization was 195 cps is only 4,870 cps compared to a syrup containing only 15% of one rubber additive which starts with a viscosity of about 95 cps and progresses to where, at the level of 45% or so solids, the viscosity is about 17,430 cps.

This remarkable decrease in viscosity cannot be fully explained but may be accounted for by the fact that the rubber particles precipitating out of the syrup as polymerization proceeds have a much finer particle size than when a single rubbery additive is used.

Similarly, in producing compositions in accordance with the present invention, the amperage required at a point near the end of polymerization to drive the agitators decrease from 64 to 66 amperes for a copolymer containing enough of a rubbery additive to provide 15% by weight of the final product to about 60 to 62 amperes for a final product containing 17% of one rubbery additive and 5% of a different rubbery additive for a total 22% rubbery additive.

In another instance a composition containing 15% of one rubber and 10% of another rubber or a total of 25% rubber only required 59 to 62 amperes at a point near the end of polymerization in contrast to the 64 to 66 amps for a composition containing 15% of a single rubber additive. On another production line, the composition containing 15% of a single rubber required 70 to 72 amperes to drive the agitator at the time of final polymerization in contrast to a composition containing 17% of one rubber and 5% of another rubber (or a total of 22% rubber) which required only 61½ to 62 amperes. When production planning requires consideration of energy conservation, it is highly advantageous to make a better product while using considerably less energy.

To illustrate the advantages of the present invention over melt blended compositions of the same ingredients, that is, a copolymer of a vinyl aromatic compound and an ethylenically unsaturated dicarboxylic acid moiety with a rubbery additive, the following Example I is provided.

EXAMPLE I

Sample A comprises a composition containing styrene in an amount of about 77%, maleic anhydride in an amount of about 8%, a Stereon 720, a rubbery additive, in an amount of about 15% but which has been polymerized together with the styrene and maleic anhydride.

Sample B comprises Sample A to which has been melt blended 5% by weight of the total composition of the rubbery additive sold under the trademark KR03.

Sample C comprises Sample A to which has been melt blended 10% by weight of the total composition of the rubbery additive KR03.

Sample D is the same as Sample A except that it has 20% of the rubbery additive KR03 melt blended therewith.

Table I shows the physical properties of Samples A through D. The use of the two rubbery additives does add some slight improvement to the impact properties.

TABLE I

| Sample | A | B | C | D |
|---|---|---|---|---|
| Izod Impact, notched ft.-lbs./inch. (ASTM D-256) | 3.2 | 3.4 | 3.5 | 3.7 |
| Falling Weight Impact, inch lbs. | 302 | 362 | 356 | 442 |
| Gardner Impact, inch lbs. | 98 | 128 | 129 | 112 |
| Vicat Softening Pt. (ASTM D-1525) | | | | |
| °C. | 119 | 118 | 117 | 116 |
| °F. | 246 | 244 | 243 | 241 |
| Tens. Strength, psi (ASTM D-638) | 4,100 | 4,500 | 4,200 | 4,300 |
| Flex. Strength, psi (ASTM D-790) | 9,100 | 8,200 | 7,700 | 7,500 |
| Flex. Modulus psi × $10^{-3}$ (ASTM D-790) | 326 | 327 | 309 | 294 |

The following Example II shows the advantages of polymerization of the copolymer base resin in the presence of the rubbery additives and the improvement in properties achieved in contrast to intimate mixing of the rubbery additives by blending as shown in Example I.

EXAMPLE II

Sample A duplicates Sample A as shown in Example I and comprises a base copolymer which has been polymerized in the presence of a rubbery additive (Stereon 720) in sufficient quantity to provide an end product with 15% by weight of rubbery additive. This represents a control sample.

Sample E is a sample with the same composition as Sample A made from a different run, and also represents another control sample.

Sample F is a sample in which two different rubbery additives were present during polymerization of the base copolymer resin in amounts sufficient to provide an end product having 15% Stereon 720 and 5% KR03.

Sample G is a product having 15% by weight of Stereon 720 and 5% by weight of Stereon 840 as the rubbery additives, which were present during polymerization of the base copolymer resin.

Sample H is similar to Sample G but contains 15% Stereon 720 and 10% Stereon 840.

Table II sets forth the physical property data of the Samples A, E, F, G and H. It can be seen that the samples having at least two rubbery additives present during polymerization gives significantly better properties than the samples which were melt blended in Table I.

TABLE II

| Sample | A | E | F | G | H |
|---|---|---|---|---|---|
| Izod Impact, ft. lbs./in. notched 73° F. (ASTM D-256) | 3.2 | 2.5–2.9 | 4.0 | 4.4 | 4.6 |
| Falling Weight Impact, inch lbs.* | 302 | 225 | 500 | 404 ± 13 | 638 ± 7 |
| Gardner Impact, inch lbs. | 98 | 50 | 122 | | |
| Vicat Softening Point (ASTM D-1525) | | | | | |
| °C. | 119 | 116 | 117 | 122 | 120 |
| °F. | 246 | 241 | 243 | 252 | 248 |
| Tensile Strength, psi (ASTM D-638) | 4,100 | 4,600 | 4,800 | 4,400 | 4,000 |
| Flexural Strength, psi (ASTM D-790) | 9,100 | 8,700 | 8,500 | 7,600 | 7,000 |
| Flexural Modulus, psi (ASTM D-790) | 326,000 | 330,000 | 320,000 | 310,000 | 286,000 |

*See text following.

In Tables I and II the Falling Weight Impact Test is one devised by ARCO Polymers, Inc. It involves falling weights of from one to ten pounds each having a ¾" radius on the nose and a 1.5" diameter body. Test specimens are flat sheets having a thickness of 0.0625" to 0.250" and are a minimum area of 36 square inches (6"×6" plaques). The specimens are injection molded, compression molded or extruded sheets, and are tested at an ambient temperature of about 73° F. The test procedure comprises selecting an appropriate weight and height at which 50% failure of the test specimens should occur. This will depend on the thickness and type of material being tested. The selected weight is raised to the desired height and allowed to fall freely onto the testing area. The testing area comprises a 4" hole in the base of the test apparatus over which a test specimen plaque has been disposed and clamped. Care should be taken to avoid multiple impacts; that is, if the striking weight should bounce off the test specimen, the operator should catch it to prevent it from striking the test specimen a second time. The previous steps are repeated for the remaining plurality test specimens in conformance with a dropping procedure known as the Bruceton Staircase Method in which the drop height is raised one inch after a non-failure and lowered one inch after a failure. This gives results which have a large number of failures of data points near the $F_{50}$ or mean value. The mean height of the specimens that fail and those that do not fail is calculated using the following formula:

$$mean = \Sigma I\ N_I/N,$$

in which
- N = the total number of specimens that failed or did not fail,
- I = drop height, and
- $N_I$ = the number of specimens that failed or did not fail at height I.

The two means (failure and non-failure) are the averaged to produce the $F_{50}$ or mean failure height which multiplied by the striker weight used gives the falling weight impact in inch-pounds. An adequate number of test specimens, such as, 30 or more, should be used to provide accurate, meaningful results.

EXAMPLE III

In this Example varying amounts of rubbery additive KR03 with a constant amount of rubbery additive Stereon 720 were prepared and tested as Samples I through M. The rubbery additive content and physical properties of the resultant products are shown in the following Table III.

TABLE III

| Sample | I | J | K | L | M |
|---|---|---|---|---|---|
| Stereon 720 wt. % | 15 | 15 | 15 | 15 | 15 |
| KR03 wt. % | 0 | 2 | 4 | 5 | 7 |
| Total of 2 Rubbery Additives wt. % | 15 | 17 | 19 | 20 | 22 |
| Izod Impact, ft. lbs./in. | 3.4 | 4.0 | 4.0 | 4.9 | 4.7 |
| Falling Weight Impact, inch lbs. (ARCO Polymers' test) | 300 ± 8 | 407 ± 90 | 467 ± 19 | 493 ± 15 | 517 ± 26 |
| Vicat, (ASTM D-1525) | | | | | |
| °C. | 119 | 115 | 116 | 119 | 119 |
| °F. | 246 | 239 | 241 | 246 | 246 |
| Tensile Strength, psi | 4,400 | 4,100 | 4,700 | 4,900 | 4,600 |
| Flexural Strength, psi | 8,300 | 7,500 | 8,500 | 8,600 | 7,900 |
| Flexural Modulus, psi | 341,000 | 327,000 | 336,000 | 340,000 | 329,000 |

From Table III it may be seen that in contrast to Sample I, the progressive presence of amounts of 2, 4, 5 and 7% of rubbery additive KR03 gave higher impact strengths without significantly affecting the temperature resistance or other physical properties of the products. The use of total rubber additive contents of 20% and 22% using two different rubbers showed falling weight impact improvements of 64% and 72% respectively over the product containing 15% of a single rubbery additive. This is especially significant when it is realized that rubbery additive KR03 by itself has a relatively low impact strength.

EXAMPLE IV

Samples N, O and P were prepared to show effects similar to Example III but using Stereon 840 rather than KR03 as the high vinyl aromatic rubbery additive along with Stereon 720. The rubbery additive amounts and physical properties are shown in the following Table IV.

TABLE IV

| Sample | N | O | P |
|---|---|---|---|
| Stereon 720 wt. % | 15 | 15 | 15 |
| Stereon 840 wt. % | 0 | 5 | 10 |
| Total of 2 Rubbery Additives wt. % | 15 | 20 | 25 |
| Izod Impact, ft. lbs./in. | 3.4 | 4.4 | 4.6 |
| Falling Weight Impact, inch lbs. (ARCO Polymers' test) | 300 ± 8 | 404 ± 13 | 638 ± 7 |
| Vicat, (ASTM D-1525) | | | |
| °C. | 119 | 122 | 120 |
| °F. | 246 | 252 | 248 |
| Tens. Strength, psi | 4,400 | 4,400 | 4,000 |
| Flex. Strength, psi | 8,300 | 7,600 | 7,000 |
| Flex. Modulus, psi × $10^{-3}$ | 340 | 310 | 286 |

Table IV shows the use of two different rubbery additives in total amounts of 20% and 25% (samples O and P), which prior to the present invention was not feasible, following the same commercial methods in use prior to this invention The doubling of the Falling Weight Impact Test for a product using 25% total of two different rubbery additives in contrast to the impact strength of a product having 15% of a single rubbery additive is an outstanding result to provide a high heat resistance, very high impact strength product. The fact that the product has increased ease of formability is an additional important beneficial factor for its commercial use.

Preliminary testing shows that products embodying the present invention that include the use of more than two rubbery additives, such as, 3 or 4, or more may further dramatically contribute to better products, especially when the additives are carefully selected to provide special properties for predetermined applications. From the experimental testing, it is concluded that the total rubbery additive content by weight of the base resin matrix may be as much as 40%, and still provide the impact strength improvements illustrated by the Examples set forth herein. Electron micrographs of the finished product shows that the size of the rubbery additive particles precipitated from the base resin during its polymerization are materially smaller when at least two rubbery additives are used. It is postulated that there is an interaction that occurs when at least two rubbery additives are used that accounts for the precipitation of the significantly smaller rubber particles, their greater dispersement through the matrix, and the greatly improved impact resistance of the resultant product. It is also believed that this same phenomenon accounts for the higher gloss of the surface of articles fabricated from the resultant product.

Products made in accordance with the present invention are also compatible with reinforcement additives, such as, glass fibers or other additives for this purpose that are well known in the art. In one instance, the use of 10% glass fibers raised the tensile strength from a range of about 4,000 to 5,000 psi to about 8,000 psi, flexural strength was raised from the range of about 7,000 to 9,000 psi to about 13,000 to 14,000 psi, and flexural modulus was improved from the range of about 300,000 to 350,000 psi to about 492,000 psi. When glass fibers in the amount of 20% were added, the tensile strenghts reached about 10,000 or 11,000 psi, flexural strengths attained about 18,000 psi, and flexural modulus attained about 714,000 psi.

As previously, described, the preferred base resin or copolymer composition comprises an aromatic vinyl monomer and an ethylenically unsaturated dicarboxylic acid moiety. The proportions of these two ingredients may be varied, according to the degree of heat resistance desired. Thus, the proportion of the dicarboxylic acid moiety may be varied from a minimum amount sufficient to provide a significant amount of increased heat resistance to a maximum of 25% or more. At amounts of about 25% or 30% or even slightly less, the impact increasing propensity of the multiple rubbery additives during polymerization is believed to decrease. In other words, the beneficial effects on improvement of the impact strength are proportionally decreased. This brings into play the economics of the final product and whether the cost of such a final product will be compatible or competitive with other available different materials. At some point the final product with high dicarboxylic acid moiety content and high total rubbery additive content may be deficient in one or more specific physical properties desired for certain end use applications.

It is also contemplated by the present invention that in addition to reinforcing agents, the products may also contain colorants, fire retardant agents, plasticizers extenders, lubricants, oxidation inhibitors, stabilizers, and the like, provided they are compatible with the ingredients being used and do not distort the usefulness of such final products to an unsatisfactory degree.

We claim:

1. A thermoplastic composition comprising:
   (1) from about 60 to about 90% by weight of a non-equimolar copolymer comprising from about 70 to 98% by weight of a vinyl aromatic monomer and from about 2 to about 30% by weight of an $\alpha, \beta$ ethylenically unsaturated dicarboxylic acid, its corresponding anhydride or imide,
   (2) from about 5 to about 20% by weight of a high conjugated diene-styrenic first copolymer, and
   (3) from about 2 to about 20% by weight of a high vinyl aromatic monomer-conjugated diene second copolymer, wherein the components of (1) are polymerized in the presence of components (2) and (3), with the further limitations that:
   (a) said first copolymer comprises from about 60 to about 98% by weight of the conjugated diene,
   (b) said second copolymer being a block copolymer which comprises a greater amount of vinyl aromatic than conjugated diene monomer, and
   (c) said first and said second copolymers cannot be the same, the resulting thermoplastic composition exhibiting improved impact strength upon molding as compared to the impact strength of the thermoplastic composition prepared by the admixture of components (1), (2) and (3).

2. The thermoplastic composition of claim 1 in which said non-equimolar copolymer is styrene-maleic anhydride.

3. The thermoplastic composition of claim 1 in which said second copolymer comprises about 75% by weight of the vinyl aromatic monomer and about 25% by weight butadiene.

* * * * *